United States Patent [19]

Kasugai et al.

[11] Patent Number: 4,854,471
[45] Date of Patent: Aug. 8, 1989

[54] FUEL CAP

[75] Inventors: Joji Kasugai, Ichinomiya; Satoshi Toki, Inazawa; Masayuki Ide, Toyota, all of Japan

[73] Assignees: Toyoda Gosei Co., Ltd., Nishikasugai; Toyota Jidosha Kabushiki Kaisha, Toyota, both of Japan

[21] Appl. No.: 251,395

[22] Filed: Sep. 30, 1988

[30] Foreign Application Priority Data

Oct. 15, 1987 [JP] Japan .................................. 62-260524

[51] Int. Cl.$^4$ ................................................ B65D 41/34
[52] U.S. Cl. ...................................... 220/288; 220/266; 220/DIG. 33
[58] Field of Search ............... 220/266, 276, DIG. 32, 220/DIG. 33, 288

[56] References Cited

U.S. PATENT DOCUMENTS

| 4,177,931 | 12/1979 | Evans | 220/266 X |
| 4,540,103 | 9/1985 | Kasugai et al. | 220/203 |
| 4,572,396 | 2/1986 | Kasugai et al. | 220/203 |
| 4,588,102 | 5/1986 | Kasugai | 220/203 |
| 4,666,056 | 5/1987 | Kasugai et al. | 220/203 |
| 4,724,868 | 2/1988 | Kasugai et al. | 220/209 X |
| 4,726,488 | 2/1988 | Kasugai | 220/203 |
| 4,779,755 | 10/1988 | Harris | 220/DIG. 33 |
| 4,785,961 | 11/1988 | Kasugai et al. | 220/203 |

Primary Examiner—Donald F. Norton
Attorney, Agent, or Firm—Cushman, Darby & Cushman

[57] ABSTRACT

A fuel cap comprises a cap body, a flange member projecting outward in radial direction on upper side of the cap body, and a weak portion which is easily broken and provided at the flange member and enables separation of the flange member from the cap body. The weak portion is formed by a plurality of V-like grooves at upper surface side which are formed on the upper surface of the flange member in concentric relation and a plurality of V-like grooves at lower surface side which are formed on the lower surface of the flange member in concentric relation and adjacent to the V-like grooves at upper surface side.

6 Claims, 7 Drawing Sheets

FUEL CAP

BACKGROUND OF THE INVENTION

1. Field of the Invention

The present invention relates to a fuel cap which is installed to a filler neck of a fuel tank in automobiles.

2. Description of the Prior Art

In a fuel cap 1 of the prior art as shown in FIG. 1, a cap body 2 of cylindrical shape is provided on upper side with a flange member 5 which is projected outward in the radial direction of the cap body 2, and a cover 9 which covers the upper side of the cap body 2 is externally fitted to the flange member 5 (refer to U.S. Pat. No. 4,177,931).

A male screw portion 2a which installs the fuel cap 1 to a filler neck 10 is formed on outer circumference of the cap body 2, and a seal ring 4 which seals the filler neck 10 at the installing state to the filler neck 10 is arranged on lower surface of the flange member 5.

V-like grooves 6, 7 with V-like cross-section are formed on the upper and lower surfaces of the flange member 5 at outward position from the seal ring 4 in the radial direction of the cap body 2 along the circumferential direction of the cap body 2, and a weak portion 8 with small thickness is formed by these V-like grooves 6, 7.

The weak portion 8 is provided so that the flange member 5 can be separated from the cap body 2 in order to secure the seal property with the filler neck 10, when the external force, i.e. force applied to the fuel cap 1 so as to force open the fueld cap 1 from the filler neck 10, acts on the flange member 5 through the cover 9 by a body outside plate or the like (not shown) after the fuel cap 1 is installed to the filler neck 10.

Numeral 3 designates a valve mechanism which adjusts pressure within the fuel tank after the fuel cap 1 is installed to the filler neck 10.

In the fuel cap 1 of the prior art, the weak portion 8 which separates the flange member 5 from the cap body 2 at the prescribed time is formed by the V-like grooves 6, 7 provided on the upper and lower surfaces of the flange member 5 respectively in one groove per each surface.

Consequently, when the flange member 5 is separated, one surface connecting the most depressed portions of the V-like grooves 6, 7 always becomes the breaking surface D, and the weak portion 8 is broken at the breaking surface D and the separation is performed.

In such breaking, however, the breaking load to the external force F1 acting nearly parallel to the breaking surface D becomes small, and the breaking load to the external force F2 acting nearly perpendicular to the breaking surface D becomes large. Consequently, in the fuel cap 1 of the prior art, the breaking surface D is one sort, and the breaking load of the weak portion 8 is varied by the direction of the external force acting on the flange member 5.

SUMMARY OF THE INVENTION

An object of the invention is to provide a fuel cap wherein even if external forces from various directions act on a flange member, variation of breaking load at a weak portion can be suppressed.

The foregoing object can attained by a fuel cap comprising a cap body; a flange member projecting outward in radial direction on upper side of the cap body; and a weak portion being easily broken and provided at the flange member so as to enable separation of the flange member from the cap body, the weak portion being formed by a plurality of V-like grooves at upper surface side which are formed on the upper surface of the flange member in concentric relation and a plurality of V-like grooves at lower surface side which are formed on the lower surface of the flange member in concentric relation and adjacent to the V-like grooves at the upper surface side.

In the fuel cap according to the invention, the weak portion is formed by the plurality of V-like grooves at upper surface side and V-like grooves at lower surface side neighboring respectively in the upper and lower surfaces of the flange member, and the breaking surfaces connecting the most depressed portions of the V-like grooves on the upper and lower surfaces can be taken not in one sort but in plural sorts slanted in various directions.

Consequently, in the fuel cap according to the invention, since the breaking surfaces slanted in various directions can be secured, even if the external forces from various directions act on the flange member, the weak portion can be broken by the corresponding breaking surface, and variation of the breaking load at the weak portion can be suppressed in comparison to the prior art.

DESCRIPTION OF THE PREFERRED EMBODIMENTS

Preferred embodiments of the invention will now be described referring to the accompanying drawings.

Figure 1:
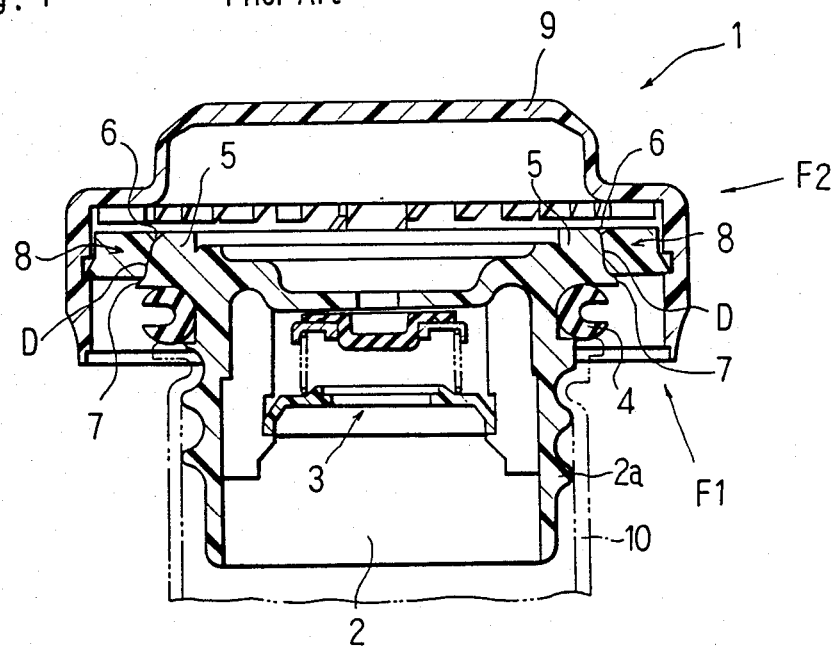
FIG. 1 is a sectional view of a fuel cap in the prior art.
Figure 2:
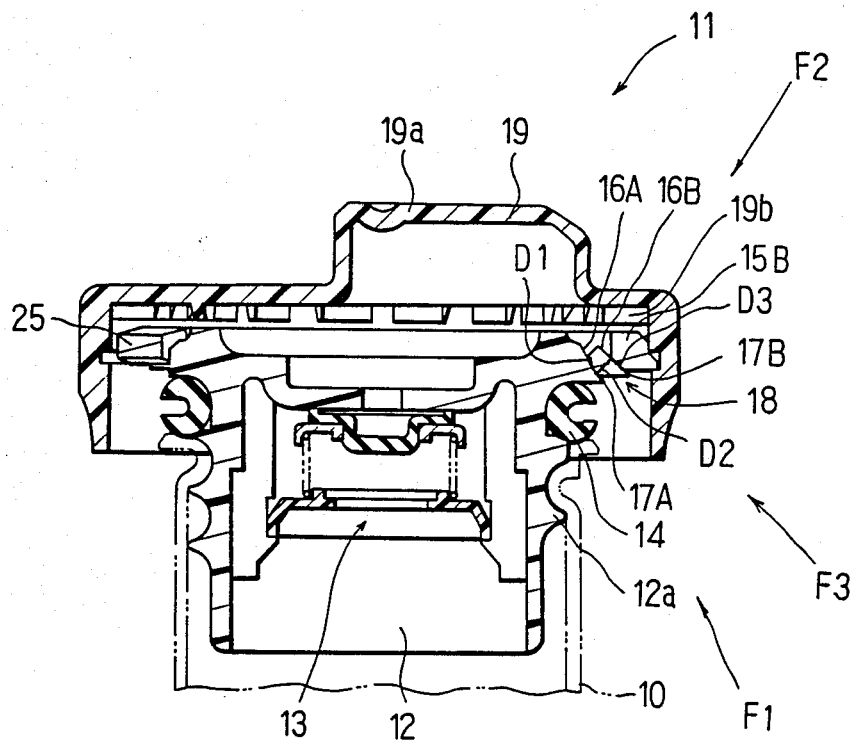
FIG. 2 is a sectional view of a fuel cap as an embodiment of the invention and taken in position II—II of FIG. 3 and FIG. 5.

A fuel cap 11 as an embodiment shown in FIG. 2 is composed of a cap body 12 made of plastic material such as polyacetal in cylindrical form, and a cover 19 made of plastic material such as polyamide so as to cover upper side of the cap body 12.

Figure 3:
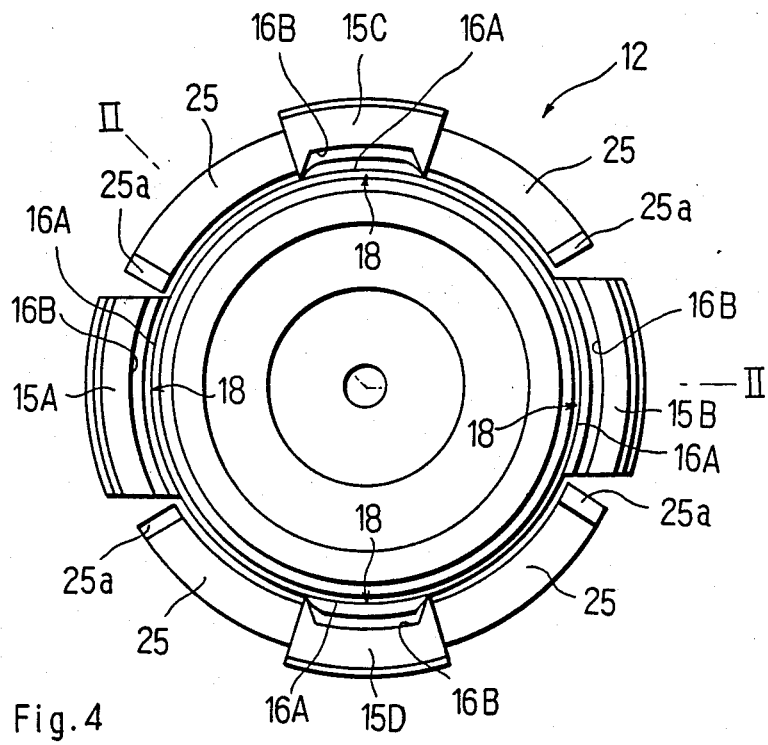
FIG. 3 is a plan view of a cap body in the embodiment.

On the upper side of the cap body 12, four flange elements 15 (15A, 15B, 15C, 15D) are projected outward in radial directions of the cap body 12 and the cover 19 is externally fitted thereto, and the flange elements 15 are nearly equal in circumferential length of the cap body 12 and formed integrally with the cap body 12 (refer to FIG. 3).

A valve mechanism 13 is arranged inside the cap body 12.

A male screw portion 12a for installing the fuel cap 11 to a filler neck 10 is formed on outer circumference of the cap body 12, and a seal ring 14 for sealing the filler neck 10 at the installation state to the filler neck 10 is arranged extending to lower surface of the flange elements 15.

Figure 4:
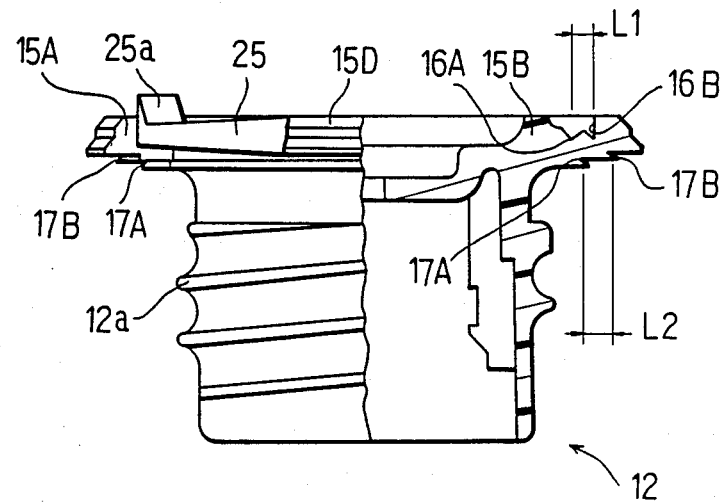
FIG. 4 is a front view partly in section of the cap body of the embodiment.

The two flange elements 15C, 15D are provided with two elastic arms 25, 25 extending in the circumferential direction of the cap body 12 and having pawl pieces 25a at the top end for slanting in prescribed direction (refer to FIG. 4).

Figure 5:
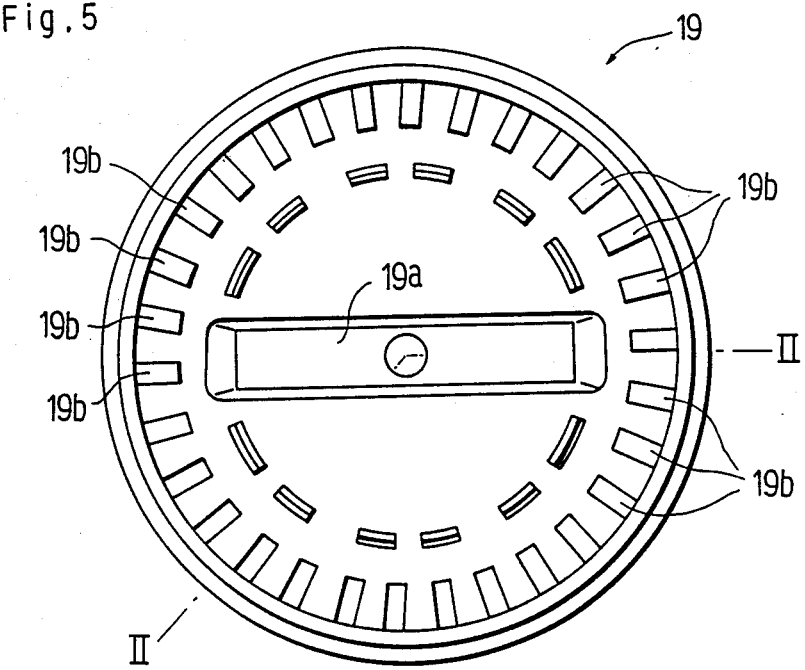
FIG. 5 is a bottom view of a cover in the embodiment.

These elastic arms 25 cooperate with a number of ratchet projections 19b which are projected on rear surface of the cover 19 and engageable with pawl pieces 25a and slanted in prescribed direction (refer to FIG. 5). When the fuel cap 11 is installed to the filler neck 10 by holding a grasping portion 19a of the cover 19, if the tightening is performed at prescribed torque or more, the elastic arms 25 are deformed in spring elasticity thereby the engagement of the pawl pieces 25a with the ratchet projections 19b is released and the cover 19 is raced with respect to the cap body 12. That is, the elastic arms 25 are used to control the tightening torque.

The above-mentioned construction is similar to that in a fuel cap of the prior art.

In the fuel cap 11 of the embodiment, from the seal ring 14 in each flange element 15 to upper surface side of the cap body 12 outward in radial direction, two V-like grooves 16A, 16B with V-like cross-section are formed along the circumferential direction of the cap body 12 in concentiric manner.

Also from the seal ring 14 in each flange element 15 to lower surface side thereof upward, two V-like grooves 17A, 17B with V-like cross-section are formed in shifting outward from position just below the V-like grooves 16A, 16B at the upper surface side and have distance L2 being different from the distance L1 between the V-like grooves 16A, 16B at the upper surface side and are formed adjacent to the V-like grooves 16A, 16B at the upper surface side along the circumferential direction of the cap body 12 in concentric manner.

These V-like grooves 16A, 16B at the upper surface side and the V-like grooves 17A, 17B at the lower surface side construct a weak portion 18 which can be easily broken in prescribed time.

In the weak portion 18 of the embodiment, the prescribed V-like grooves 16A, 16B, 17A, 17B are formed in two per each of the upper and lower surfaces of the flange elements 15, and the flange elements 15 can be separated from the cap body 12 by three sorts of breaking surfaces D1, D2, D3 each being different in the slant direction and nearly equal in the breaking distance.

Consequently, after the fuel cap 11 of the embodiment is installed to the filler neck 10, if external forces F1, F2, F3 from various directions act on the flange elements 15 through the cover 19, among the three breaking surfaces D1, D2, D3 being different in the slant direction, the weak portion 18 can be broken at one breaking surface being in small breaking load in suitable correspondence and having the slant nearly parallel to the direction of the acting external force, thereby variation of the breaking load of the weak portion 18 can be suppressed in comparison to the fuel cap 1 of the prior art where only one sort of the breaking surface is formed.

Figure 6:
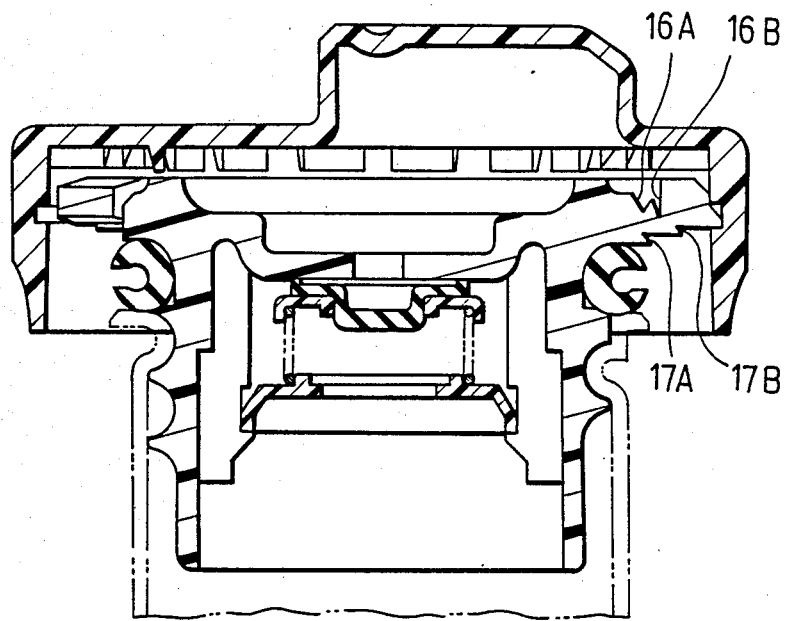
FIG. 6 is a sectional view of a fuel cap as another embodiment.
Figure 7:
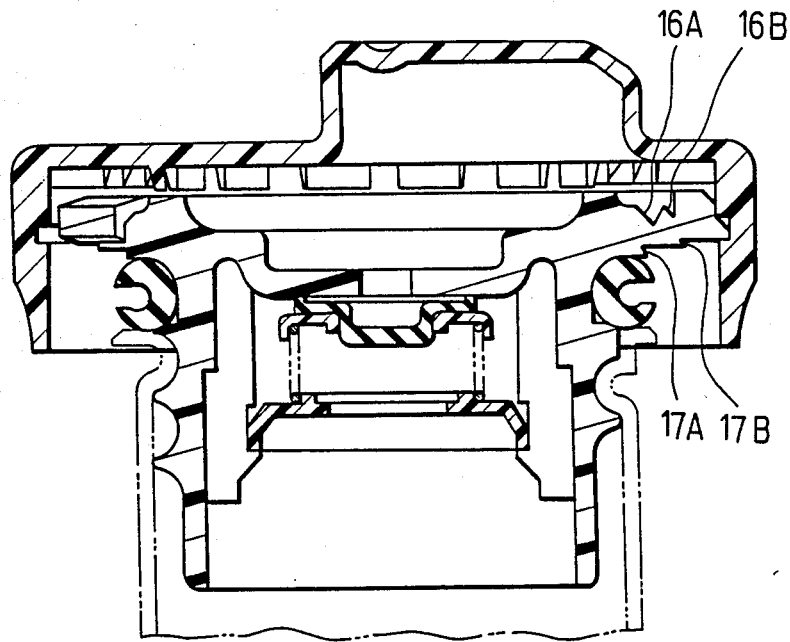
FIG. 7 is a sectional view of a fuel cap as still another embodiment of the invention.
Figure 8:
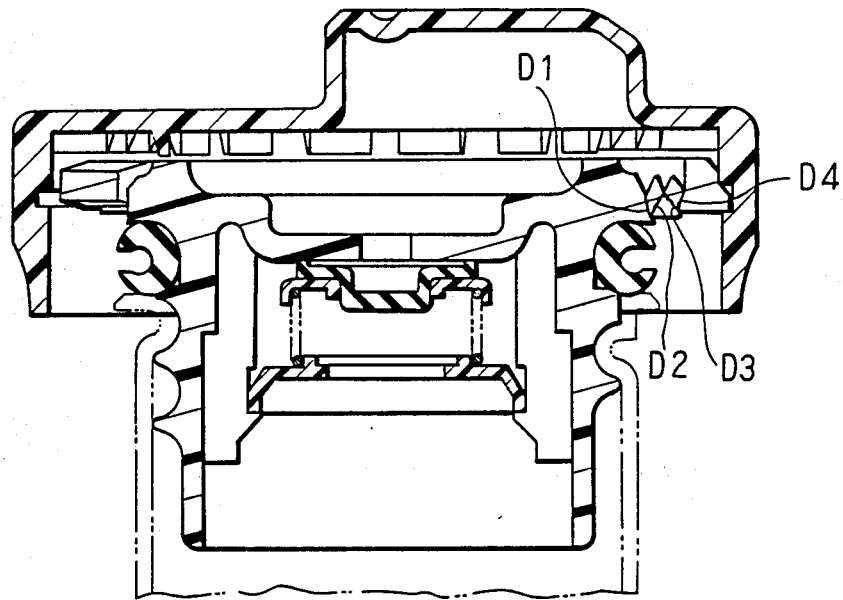
FIG. 8 is a sectional view of a fuel cap as still another embodiment of the invention.

In the fuel cap 11 of the embodiment, although the V-like grooves 17A, 17B at the lower surface side are shifted outward from the V-like grooves 16A, 16B at the upper surface side, of course, the V-like groove 17A may be provided just below the V-like groove 16A (refer to FIG. 6), or the V-like grooves 16A, 16B at the upper surface side may be shifted ouwtward from the V-like grooves 17A, at the lower surface side (refer to FIG. 7). In order to change the respective slant directions of the breaking surfaces D1, D2, D3, the position relation of each of the V-like grooves 16A, 16B, 17A, 17B may be changed variously. Further in order to increase the breaking surface, the number of the V-like grooves may be increased (refer to FIG. 8). In FIG. 8, four breaking surfaces D1, D2, D3, D4 are formed.

When a plurality of breaking surfaces being different in the slant can be formed, even if these breaking surfaces are slightly different in the breaking distance, variation of the breaking load at the weak portion can be suppressed in comparison to the fuel cap 1 of the prior art where only one sort of the breaking surface is formed.

What is claimed is;

1. A fuel cap comprising;
(a) a cap body;
(b) a flange member projecting outward in radial direction on upper side of said cap body; and
(c) a weak portion being easily broken and provided at said flange member so as to enable separation of the flange member from the cap body, said weak portion being formed by a plurality of V-like grooves at upper surface side which are formed on the upper surface of the flange member in concentric relation and a plurality of V-like grooves at lower surface side which are formed on the lower surface of the flange member in concentric relation and adjacent to the V-like grooves at upper surface side.

2. A fuel cap as set forth in claim 1, wherein said V-like grooves at upper surface side and said V-like grooves at lower surface side are formed respectively in two grooves per each surface, and distance between the two V-like grooves at upper surface side and distance between the two V-like grooves at lower surface side are different from each other.

3. A fuel cap as set forth in claim 2, wherein the distance between the two V-like grooves at lower surface side is wider than the distance between the two V-like grooves at upper surface side, and the V-like groove at lower surface side positioned inside among the two like grooves at lower surface side is arranged outward in radial direction from position just below the V-like groove at upper surface side positioned inside among the two V-like grooves at upper surface side.

4. A fuel cap as set forth in claim 2, wherein the distance between the two V-like grooves at lower surface side is wider than the distance between the two V-like grooves at upper surface side, and the V-like groove at lower surface side positioned inside among the two V-like grooves at lower surface side is arranged just below the V-like groove at upper surface side positioned inside among the two V-like grooves at upper surface side.

5. A fuel cap as set forth in claim 2, wherein the distance between the two V-like grooves at lower surface side is wider than the distance between the two V-like grooves at upper surface side, and the V-like groove at lower surface side positioned inside among the two V-like grooves at lower surface side is arranged inward in radial direction from position just below the V-like groove at upper surface side positioned inside among the two V-like grooves at upper surface side.

6. A fuel cap as set forth in claim 1, wherein said V-like grooves at upper surface side and said V-like grooves at lower surface side are formed in two grooves or more at least at one side and in three grooves or more at the other side.

* * * * *